Oct. 2, 1962     G. J. KIPPER     3,056,487

SCREW CONVEYOR FOR FIBROUS MATERIAL

Filed Dec. 30, 1959

INVENTOR.
George J. Kipper
BY
Fred C. Matheny
ATTORNEY

United States Patent Office 3,056,487
Patented Oct. 2, 1962

3,056,487
SCREW CONVEYOR FOR FIBROUS MATERIAL
George J. Kipper, Seattle, Wash., assignor to Wyatt & Kipper, Engineers, Inc., Seattle, Wash., a corporation of Washington
Filed Dec. 30, 1959, Ser. No. 862,930
4 Claims. (Cl. 198—214)

My invention relates to a screw conveyor for fibrous material, such as bagasse or wood waste.

An object of my invention is to provide a screw conveyor which can be successfully used to evenly convey or feed fibrous material such as bagasse and wood waste without danger of clogging.

Another object is to provide a screw conveyor for fibrous material comprising a conveyor trough having therein a longitudinally extending driven conveyor screw, said screw and trough being of varying cross sectional size relative to each other, longitudinally considered, whereby a progressively increasing clearance is provided between the periphery of the screw and the inner wall of the trough from the infeed toward the discharge end of the conveyor.

Another object is to provide a conveyor screw having a flight which is of increasing pitch from the infeed toward the discharge end of said screw.

When bagasse, which is sugar cane with a large percentage of the moisture extracted, is used as fuel it is desirable to feed the same with a conveyor screw which operates in a conveyor trough. However, much difficulty has heretofore been encountered in getting a screw type conveyor to feed bagasse and like fibrous material evenly and without clogging. I have found that this difficulty can be overcome by providing, in a screw type conveyor, a progressively increasing clearance from the infeed toward the discharge end between the periphery of the conveyor screw and the inside wall of the conveyor trough in which it operates, and further that such a conveyor screw will feed the material more evenly and is less subject to clogging if the screw is of progressively increasing pitch from its infeed toward its discharge end.

Other objects of my invention will be apparent from the following description and accompanying drawings.

Like reference numerals refer to like parts throughout the several views.

Figure 1:
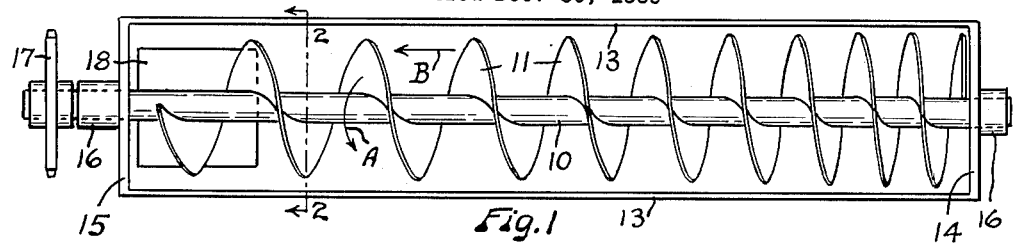
FIGURE 1 is a top plan view illustrating an embodiment of my invention wherein a variable pitch conveyor screw having a convergent taper from infeed to discharge end thereof is operatively disposed in a conveyor trough of uniform cross sectional shape and area.
Figure 2:
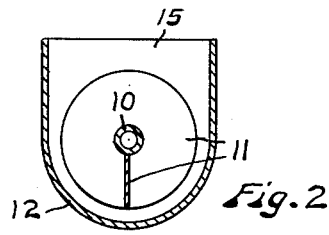
FIG. 2 is a cross sectional view taken substantially on broken line 2—2 of FIG. 1.
Figure 3:
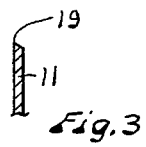
FIG. 3 is an enlarged fragmentary cross sectional detail showing the beveled peripheral portion of the conveyor screw flight.

FIGS. 1, 2 and 3 show a conveyor screw consisting of a tubular shaft 10 having thereon a helical flight 11. The flight 11 is of progressively decreasing external diameter and of progressively increasing pitch from the infeed end, shown at the right, to the discharge end, shown at the left, in FIG. 1. Said conveyor screw is operatively disposed within a conveyor trough which is non-tapered and of uniform cross sectional area from end to end. The conveyor trough comprises a semi-cylindrical bottom portion 12, upwardly directed flat side walls 13, and end walls 14 and 15. Bearings 16 rigid with the end walls 14 and 15 support the conveyor shaft 10 for rotation on an axis coincident with the axis of the semi-cylindrical bottom portion 12 of said trough. A sprocket wheel 17 can be attached to one end portion of the shaft 10 and connected with any suitable driving means to drive the conveyor shaft in the direction indicated by the arrow A, FIG. 1. This will advance material in the direction indicated by arrow B. Fibrous material, such as bagasse or wood waste is fed, by any suitable means, into the end portion of the conveyor trough shown at the right and is discharged through a discharge opening 18 in the end portion of the conveyor shown at the left in FIG. 1. Preferably the periphery of the flight 11 is beveled, as shown in FIG. 3, so that the forward edge 19 of said flight 11 is fairly sharp.

Using a conveyor screw which is tapered from its infeed toward its discharge end within a non-tapered conveyor trough, as illustrated in FIG. 1, provides a clearance of progressively increasing area between the periphery of the screw and the inner wall of the conveyor trough from infeed toward discharge end of the conveyor. This obviates clogging of the conveyor, such as would otherwise occur, in the handling of fibrous materials like bagasse or wood paste. As an example it has been found that for handling bagasse with a conveyor screw twenty-two inches in diameter at its larger infeed end, operating in a conveyor trough twenty-four inches wide, a taper about one fourth inch per foot of length of the screw is satisfactory. Obviously this taper can be varied, depending somewhat on the characteristics of the material to be handled.

Figure 4:
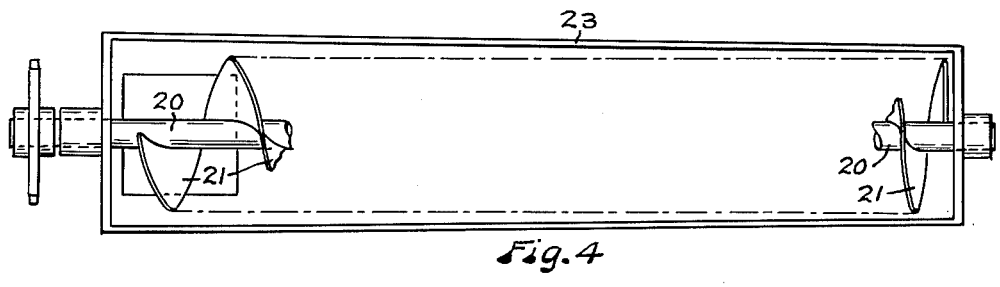
FIG. 4 is a partly diagrammatic plan view illustrating an embodiment of my invention in which a non-tapered variable pitch conveyor screw is operatively disposed in a conveyor trough which is divergently tapered from infeed to discharge end.

FIG. 4 shows another way of obtaining progressively increasing clearance between the periphery of a conveyor screw and the inner wall of a conveyor trough from infeed toward discharge end. In this instance the screw, consisting of shaft 20 having thereon variable pitch flight 21, is non-tapered and of uniform over-all diameter from end to end. Said screw is operatively disposed in a conveyor trough 23 which is of expanding or divergently tapered shape from its infeed end, shown at the right, toward its discharge end, shown at the left. This provides progressively increasing clearance from infeed toward discharge end using a screw of constant diameter.

Figure 5:
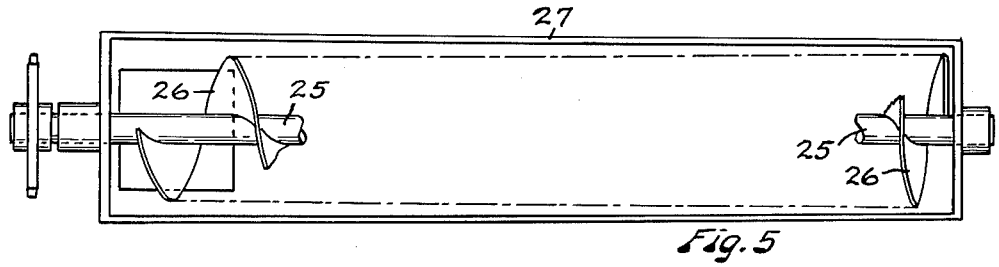
FIG. 5 is a partly diagrammatic plan view illustrating an embodiment of my invention in which both a variable pitch conveyor screw and a conveyor trough are tapered at different angles and in such a manner as to provide uniformly increasing clearance between the periphery of the screw and the inner wall of the trough from infeed toward discharge end of the conveyor.

FIG. 5 shows still another way of obtaining progressively increasing clearance between the periphery of a conveyor screw and the inner wall of a conveyor trough from infeed toward discharge end thereof. The conveyor screw shown in FIG. 5 comprises a shaft 25 having thereon a flight 26. The screw 25, 26 is operatively disposed within a conveyor trough 27. Said screw 25, 26 is convergently tapered from the infeed toward the discharge end thereof. The conveyor trough 27 is of expanding or progressively increasing cross section from the infeed toward the discharge end thereof. Thus progressively increasing clearance is provided between the peripheral portion of the screw flight 26 and the inside wall of the conveyor 27 from infeed toward discharge end thereof.

Obviously progressively increasing clearance between the periphery of a screw and the wall of a trough from infeed toward discharge end can be provided by making both the screw and the trough either converge or diverge but at different angles.

The foregoing description and accompanying drawings disclose preferred embodiments of my invention but it will be understood that changes may be made within the scope of the following claims.

I claim:

1. A screw conveyor for fibrous material comprising a conveyor trough having an infeed and a discharge end; and a rotatively driven conveyor screw of progressively increasing pitch from infeed toward discharge end thereof operatively disposed longitudinally within said conveyor trough, the overall diameter of the screw and the cross sectional area of the trough varying relative to each other longitudinally of the conveyor providing progressively increasing clearance between the periphery of the conveyor screw and the inner wall of the conveyor trough from infeed toward discharge end of the conveyor.

2. In a screw conveyor for fibrous material, a conveyor trough of progressively expanding cross sectional area from an infeed toward a discharge end thereof; and a driven conveyor screw of substantially uniform diameter and of progressively increasing pitch from its infeed toward its discharge end operatively disposed within said conveyor trough, whereby progressively increasing clearance is provided between the periphery of the conveyor screw and the inner wall of the conveyor trough from infeed toward discharge end of the conveyor.

3. In a screw conveyor for fibrous material, a conveyor trough of progressively expanding cross sectional area from an infeed toward a discharge end thereof; and a driven conveyor screw of progressively decreasing diameter and of progressively increasing pitch from its infeed toward its discharge end operatively disposed within said conveyor trough, whereby progressively increasing clearance is provided between the periphery of the conveyor screw and the inner wall of the conveyor trough from infeed toward discharge end of the conveyor.

4. In a screw conveyor for fibrous material, a conveyor trough of constant cross sectional area from an infeed toward a discharge end thereof; and a driven conveyor screw of progressively decreasing external diameter and of progressively increasing pitch from its infeed toward its discharge end operatively disposed within said conveyor trough, whereby progressively increasing clearance is provided between the periphery of the conveyor screw and the inner wall of the conveyor trough from infeed toward discharge end of the conveyor.

References Cited in the file of this patent

UNITED STATES PATENTS

| | | |
|---|---|---|
| 688,806 | Young | Dec. 10, 1901 |
| 1,423,698 | Thurston | July 25, 1922 |
| 2,507,245 | Dady | May 9, 1950 |

FOREIGN PATENTS

| | | |
|---|---|---|
| 919,640 | France | Dec. 9, 1946 |